W. H. LYMAN.

Whip-Socket.

No. 1,507. Reissued June 30, 1863

Witnesses

Robt H. Louden

Geo. W. Reed

Inventor:

Wm H. Lyman.

N. PETERS, PHOTO-LITHOGRAPHER, WASHINGTON, D. C.

UNITED STATES PATENT OFFICE.

WILLIAM H. LYMAN, OF NEWARK, NEW JERSEY.

IMPROVEMENT IN WHIP-SOCKETS.

Specification forming part of Letters Patent No. 14,669, dated April 15, 1856; Reissue No. 1,507, dated June 30, 1863.

*To all whom it may concern:*

Be it known that I, WILLIAM H. LYMAN, of Newark, in the county of Essex and State of New Jersey, have invented a new and useful Improvement in Whip-Sockets; and I do hereby declare that the following is a full, clear, and exact description of the same, reference being had to the accompanying drawings, forming a part of this specification, in which—

Figure 1:
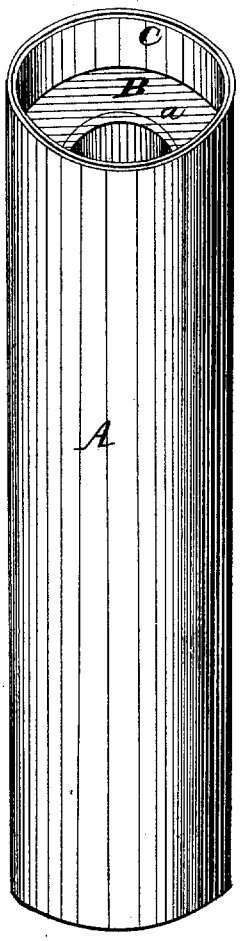
Figure 3:
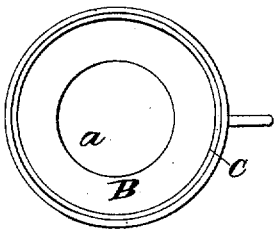
Figure 2:
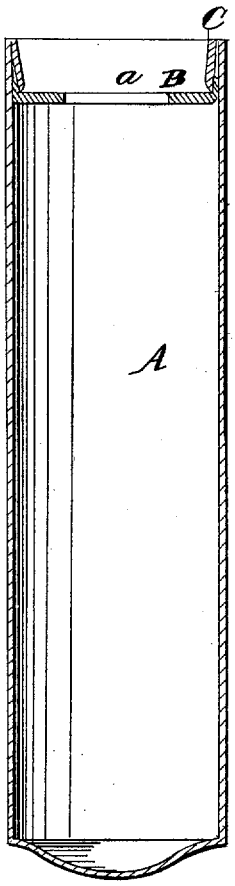

Figure 1 represents a perspective view of my invention. Fig. 2 is a longitudinal central section of the same. Fig. 3 is a plan or top view of the same.

Similar letters of reference in the three views indicate corresponding parts.

This invention consists in the application to the upper part or mouth of a whip-socket of a disk of india-rubber or other elastic flexible material, said disk being stretched across the mouth or opening of the whip-socket and provided with an opening smaller than the diameter of the whip-handle in such a manner that when said whip-handle is placed into the socket the opening in the elastic disk closes up firmly all around, and prevents dirt, dust, or other foreign substances from entering into the whip-socket and soiling the handle.

To enable others skilled in the art to make and use my invention, I will proceed to describe it.

A represents a whip-socket constructed of the well-known materials commonly used for the purpose.

B is a piece of india-rubber or other elastic flexible material, cut in a circular or other suitable form somewhat larger in diameter than the diameter of the socket A. This disk is provided with a hole, *a*, in its center, or nearly so, to receive the whip-handle, and it is stretched across the opening of the socket A, being secured to the same either by a ring, C, which fits into the socket, and which can be made to retain the disk by compressing the edge of the same between its outer surface and the inner surface of the socket, as clearly shown in Fig. 2 of the drawings, or which may be fastened to the socket in any other desirable manner. The hole *a* in the disk is somewhat smaller in diameter than the whip-handle, and if said handle is placed in the socket it has to be forced through the hole *a*, and the edge of said hole closes up tight all around the handle, and prevents dirt, dust, or other foreign substances from entering the socket and soiling the handle.

I do not confine myself to any particular mode of fastening the elastic disk to the whip-socket; but,

Having thus fully described my invention, what I claim as new, and desire to secure by Letters Patent, is—

The application to a whip-socket, A, of an elastic disk, B, provided with a hole, *a*, substantially in the manner and for the purpose herein shown and described.

WM. H. LYMAN.

Witnesses:

ROB. H. LOUDEN,

GEO. W. REED.